(12) United States Patent
Akita

(10) Patent No.: US 7,286,591 B2
(45) Date of Patent: Oct. 23, 2007

(54) SYNCHRONIZING POSITION DETECTING CIRCUIT

(75) Inventor: Hidenori Akita, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 742 days.

(21) Appl. No.: 10/684,831

(22) Filed: Oct. 15, 2003

(65) Prior Publication Data
US 2004/0135725 A1    Jul. 15, 2004

(30) Foreign Application Priority Data
Oct. 15, 2002    (JP)    ............................. 2002-300354

(51) Int. Cl.
*H04B 1/69* (2006.01)
(52) U.S. Cl. ...................... 375/147; 375/148; 375/149; 455/436; 455/456; 455/515
(58) Field of Classification Search ................ 375/147, 375/148, 149; 370/441; 455/515, 436, 456
See application file for complete search history.

(56) References Cited
U.S. PATENT DOCUMENTS
7,089,004 B2 *    8/2006    Jeong et al. ................ 455/436
2001/0051527 A1 *    12/2001    Kuwahara et al. .......... 455/456
2002/0120766 A1 *    8/2002    Okajima et al. ............ 709/232
2003/0134652 A1 *    7/2003    Ben-Eli ...................... 455/515

* cited by examiner

*Primary Examiner*—Chieh M. Fan
*Assistant Examiner*—Eva Zheng
(74) *Attorney, Agent, or Firm*—Rabin & Berdo, P.C.

(57) ABSTRACT

A synchronizing position detecting circuit includes a window size determining circuit, a synchronizing code generating circuit, a correlation circuit and a synchronizing position determining circuit. The window size determining circuit calculates a moved distance of a mobile station during a sleep time based on a moving speed and the sleep time and selects a window size based on a phase change of a distance signal corresponding to the moved distance. The code generating circuit repeatedly produces a synchronizing code that coincides with a part of a code of the distance signal and successively shifts a phase of the synchronizing code by a predetermined phase width so as to shift the window size. The correlation circuit calculates a correlation function between the synchronizing code and the distance signal. The position determining circuit determines a correlation function having a maximum value to detect the distance signal and outputs a synchronizing position signal representing a detecting position.

12 Claims, 3 Drawing Sheets

FIRST EMBODIMENT

FIRST EMBODIMENT

SECOND EMBODIMENT

EXPLANATORY DIAGRAM FOR OPERATION OF
MOVED DISTANCE ESTIMATING CIRCUIT

SYNCHRONIZING POSITION DETECTING CIRCUIT

BACKGROUND OF THE INVENTION

The present invention relates to a synchronizing position detecting circuit that detects a received signal repeating a prescribed code to output a synchronizing position of the received signal and, in particular, relates to a synchronizing position detecting circuit suitable for a CDMA (Code Division Multiple Access) mobile station receiving device that carries out intermittent reception.

In the CDMA mobile communication system, for example, a base station multiplies an information signal by a spreading code and transmits it to a mobile station, while the mobile station demodulates the information signal by producing a spreading code having the same pattern and phase as those of the spreading code of the base station and multiplying the signal received from the base station by the produced spreading code (despreading), so that it is necessary for the mobile station to acquire phase information of the spreading code of the base station. On the other hand, depending on the mobile communication system, an intermittent reception system is employed wherein a mobile station performs reception processing only during a reception term and stops the reception processing during a waiting time (sleep time) for the purpose of reducing power consumption in the mobile station.

However, in the mobile station in the mobile communication system employing the intermittent reception system, since the reception processing is once stopped during the sleep time, it is impossible to track the phase of the spreading code of the base station during the sleep time, and thus it is difficult to immediately produce a spreading code in phase with the spreading code of the base station at the start of the next reception term. Therefore, for example, the mobile station, before starting the next reception term, receives a pilot signal transmitted from the base station, acquires a synchronizing position of the spreading code of the base station based on the phase information of the spreading code of the base station included in the pilot signal, and matches the phase of a spreading code produced by a spreading code generator with the phase of the spreading code of the base station based on the acquired synchronizing position, thereby to implement the normal reception processing from the start of the reception term.

In this case, in the mobile station, a synchronizing code generator produces a spreading code (synchronizing code) having the same pattern as that of the pilot signal for the purpose of detecting the pilot signal. However, since a slight error exists in the normal synchronizing code generator, the phase of the spreading code produced by the synchronizing code generator deviates from the correct phase with a lapse of the sleep time, for example. Thus, the pilot signal can not be captured after the lapse of the sleep time. Accordingly, the mobile station calculates a correlation function between the pilot signal and the synchronizing code while shifting the phase of the synchronizing code produced in the synchronizing code generator by a prescribed chip width within a prescribed phase range, and derives a position where the correlation function becomes maximum, thereby to detect the pilot signal and determine a synchronizing position of the pilot signal.

When detecting the pilot signal, it is desirable that the synchronizing code phase shifting range (window) be set as narrow as possible in terms of reduction in cost and power consumption of the receiving device. Therefore, taking into account that the magnitude of the phase shift of the synchronizing code due to the error of the synchronizing code generator is determined by the length of the sleep time, the window size is set depending on the period of the intermittent reception (e.g. see JP-A-H11-27180, pages 3-5 and FIG. 4).

In the foregoing pilot signal capturing circuit (synchronizing position detecting circuit), however, there has been a problem that since the window size is set only taking into account the phase shift of the synchronizing code based on the error of the synchronizing code generator, it can not deal with a phase shift of the synchronizing code caused by a change in distance between the base station and the mobile station due to movement of the mobile station during the sleep time, and thus there are those instances where the pilot signal can not be detected within the set window.

SUMMARY OF THE INVENTION

The present invention may provide a synchronizing position detecting circuit for setting a window size that can securely capture a pilot signal even when a distance between a base station and a mobile station changes due to movement of the mobile station during a sleep time.

The synchronizing position detecting circuit according to the present invention includes a window size determining circuit, a synchronizing code generating circuit, a correlation circuit and a synchronizing position determining circuit. The window size determining circuit calculates a moved distance of a mobile station during a sleep time based on a moving speed and the sleep time and selects a window size based on a phase change of a distance signal corresponding to the moved distance. The code generating circuit repeatedly produces a synchronizing code that coincides with a part of a code of the distance signal and successively shifts a phase of the synchronizing code by a predetermined phase width so as to shift the window size. The correlation circuit calculates a correlation function between the synchronizing code and the distance signal. The position determining circuit determines a correlation function having a maximum value to detect the distance signal and outputs a synchronizing position signal representing a detecting position.

DETAILED DESCRIPTION OF THE PREFERRED EMBODIMENTS

Figure 1:
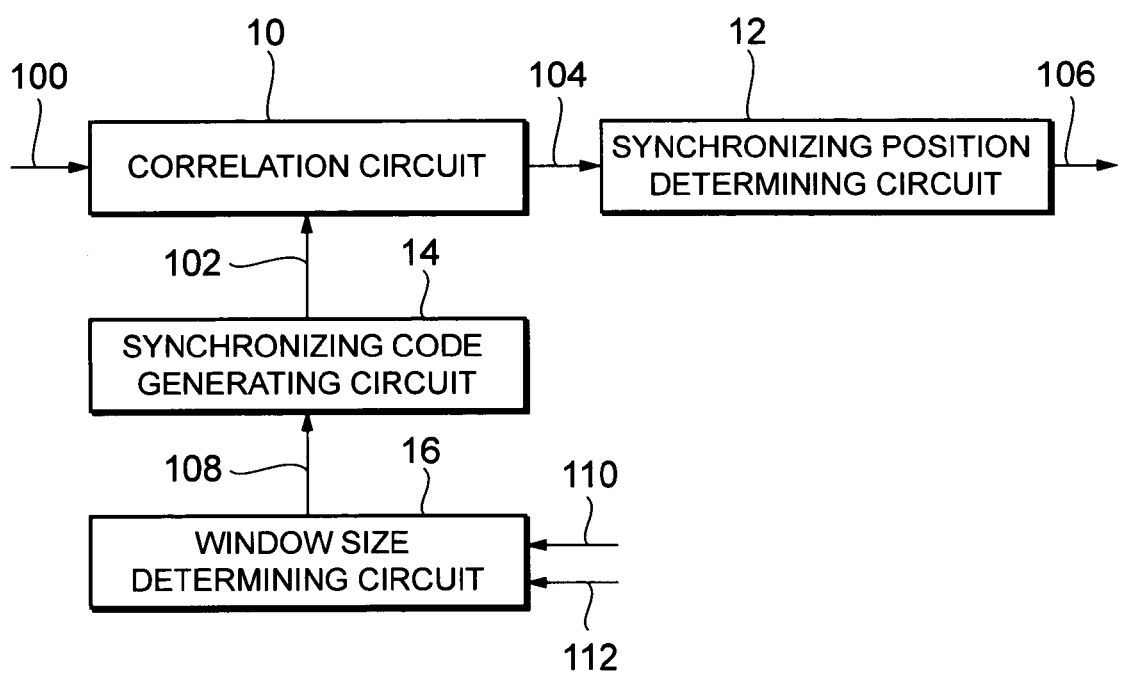
FIG. 1 is a structural diagram showing a first preferred embodiment of a synchronizing position detecting circuit according to the present invention.

Now, preferred embodiments of synchronizing position detecting circuits according to the present invention will be described in detail with reference to the accompanying drawings. FIG. 1 is a structural diagram showing the first embodiment of the synchronizing position detecting circuit according to the present invention. This synchronizing position detecting circuit is used, for example, in a receiving device, which performs intermittent reception, of a mobile station in a CDMA mobile communication system, and is particularly suitable for employment in a receiving device of a mobile station that moves on a straight line connecting between a base station and the mobile station or on a prolongation of that straight line.

As shown in FIG. 1, the synchronizing position detecting circuit of this embodiment comprises a correlation circuit 10, a synchronizing position determining circuit 12, a synchronizing code generating circuit 14 and a window size determining circuit 16. The synchronizing position determining circuit 12 and the synchronizing code generating circuit 14 are connected to the correlation circuit 10, while the window size determining circuit 16 is connected to the synchronizing code generating circuit 14. A received signal 100 repeating a prescribed code is inputted into the correlation circuit 10 from the exterior, while a sleep time 110 being a waiting time in intermittent reception and a moving speed 112 of a movable body with the mobile station installed therein are inputted into the window size determining circuit 16. In FIG. 1, reference symbols assigned to connection lines represent signals that appear in the corresponding connection lines, respectively.

When a synchronizing code 102 is fed from the synchronizing code generating circuit 14, the correlation circuit 10 calculates a correlation function between the received signal 100 and the synchronizing code 102 and outputs a correlation value 104 representing the calculated correlation function to the synchronizing position determining circuit 12. The synchronizing position determining circuit 12 detects the received signal 100 by deriving a correlation value representing the maximum value among correlation values 104 calculated by the correlation circuit 10, and outputs a synchronizing position signal 106 representing a detecting position (synchronizing position) of the received signal 100. It may also be configured that the synchronizing position determining circuit 12 compares the correlation value 104 outputted from the correlation circuit 10 with a predetermined threshold value and judges that the received signal 100 has been detected when the correlation value 104 exceeds the threshold value.

The synchronizing code generating circuit 14 comprises a synchronizing code generator that repeatedly produces a synchronizing code whose code pattern is the same as that of the received signal 100 or a synchronizing code whose code pattern agrees with part of a code pattern of the received signal 100, and phase control means that controls the phase of the synchronizing code generator. The synchronizing code generating circuit 14 controls the phase of the synchronizing code generator using the phase control means such that every time a synchronizing code of one period is produced by the synchronizing code generator, the phase of the synchronizing code of one period is shifted digitally in a fixed direction by a predetermined phase width (e.g. ¼ chip or ½ chip), and outputs the synchronizing code produced by the synchronizing code generator to the correlation circuit 10 as the synchronizing code 102 as candidate signals.

When the synchronizing position signal 106 is outputted from the synchronizing position determining circuit 12, the synchronizing code generating circuit 14 stops the phase shift control to return the shift amount to zero and controls the phase of the synchronizing code generator based on the synchronizing position signal 106, thereby to match the phase of the synchronizing code produced by the synchronizing code generator with the phase of the received signal 100. This prevents accumulation of the phase shift of the synchronizing code per sleep time. The range in which the phase of the synchronizing code 102 produced by the synchronizing code generator is shifted is set according to a window size represented by a window size signal 108 outputted from the window size determining circuit 16.

The sleep time 110 and the moving speed 112 representing the moving speed of the mobile station are inputted into the window size determining circuit 16. A value that is determined by the system employing the mobile station is inputted as the sleep time 110. On the other hand, the sleep time 110 may be inputted by selecting one of three sleep times T, 2T and 3T (T represents a prescribed time), for example. It is desirable that the moving speed of the mobile station measured by a speedometer is inputted as the moving speed 112. On the other hand, for the purpose of simplifying the structure, the moving speed 112 may be inputted by selecting one of three moving speeds V, 2V and 3V (V represents a prescribed speed) that is approximate to an expected moving speed.

The window size determining circuit 16 determines the optimum window size based on the moving speed 112 of the mobile station and the sleep time 110. Specifically, the window size determining circuit 16 derives the product of the sleep time 110 and the moving speed 112 per period of the intermittent reception, thereby to calculate a moved distance of the mobile station during one sleep time. In this embodiment, it is assumed that the mobile station moves on a straight line connecting between the base station and the mobile station or on a prolongation of that straight line, and thus the calculated moved distance corresponds to a change in distance between the base station and the mobile station during one sleep time. The window size determining circuit 16 is provided in advance with a table describing window sizes corresponding to moved distances, and selects a window size corresponding to a calculated moved distance so as to produce the window size signal 108 representing the selected window size.

The window size is set to a size that can securely capture the received signal 100, taking into account a change in phase of the received signal 100 caused by the fact that the mobile station moves during one sleep time to change a distance between the base station and the mobile station so that a time required for a signal transmitted from the base station to reach the mobile station changes. On the other hand, the window size may also be determined taking into account, in addition to the phase change of the received signal 100, an amount of the phase of the synchronizing code produced by the synchronizing code generator included in the synchronizing code generating circuit 14, that is shifted during one sleep time based on an error of the synchronizing code generator. Further, although the window size determining circuit 16 determines the window size per period of the intermittent reception in this embodiment, the window size may also be determined per a plurality of periods.

An operation of the thus configured synchronizing position detecting circuit will be described assuming that the sleep time 110 and the moving speed 112 are inputted into the window size determining circuit 16. The window size determining circuit 16 calculates a moved distance by multiplying the sleep time 110 by the moving speed 112 per period of the intermittent reception, for example, selects a window size corresponding to the calculated moved distance from the table and outputs the window size signal 108 representing the selected window size to the synchronizing code generating circuit 14.

In the synchronizing code generating circuit 14, the synchronizing code generator repeatedly produces a synchronizing code whose code pattern is the same as that of the received signal 100 or a synchronizing code whose code pattern agrees with part of a code pattern of the received signal 100, and the phase control means controls the phase of the synchronizing code generator such that every time the synchronizing code generator produces a synchronizing code of one period, the phase control means shifts the phase of the synchronizing code of one period digitally in a fixed direction by a predetermined phase width. The synchronizing code phase shifting range is limited according to the window size represented by the window size signal 108. The synchronizing code generating circuit 14 outputs the produced synchronizing code to the correlation circuit 10 as the synchronizing code 102 (that is. candidate signals with different phases).

When the synchronizing code 102 is fed from the synchronizing code generating circuit 14, the correlation circuit 10 calculates a correlation function between the received signal 100 inputted from the exterior and the synchronizing code 102 and outputs the correlation value 104 representing the calculated correlation function to the synchronizing position determining circuit 12. The synchronizing position determining circuit 12 determines a correlation value representing the maximum value among the correlation values 104 calculated by the correlation circuit 10 and, assuming that the received signal 100 is detected when the maximum correlation value is obtained, outputs the synchronizing position signal 106 representing the detecting position (timing) of the received signal 100. When the synchronizing position signal 106 is outputted from the synchronizing position determining circuit 12, the synchronizing code generating circuit 14 stops the phase shift control to return the shift amount to zero and controls the phase of the synchronizing code generator based on the synchronizing position signal 106, thereby to match the phase of the synchronizing code with the phase of the received signal 100.

As described above, according to the first embodiment, the size of the window for searching for the received signal 100 is determined taking into account the moved distance of the mobile station during the sleep time. Therefore, even if the mobile station moves during the sleep time, it is possible to capture the received signal 100 securely and quickly without losing it.

Figure 2:
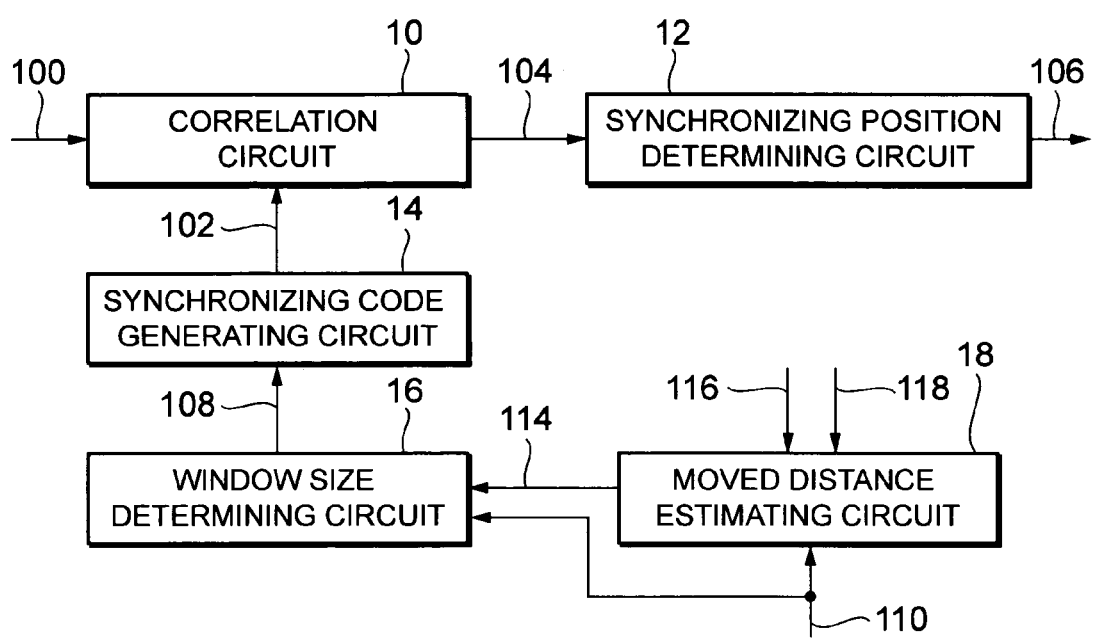
FIG. 2 is a structural diagram showing a second preferred embodiment of a synchronizing position detecting circuit according to the present invention.

FIG. 2 is a structural diagram showing the second embodiment of the synchronizing position detecting circuit according to the present invention. In the first embodiment, it is assumed that the mobile station moves on a straight line connecting between the base station and the mobile station or on a prolongation of that straight line. On the other hand, the second embodiment is applicable to a case where the mobile station moves in any directions relative to the base station. In the synchronizing position detecting circuit according to the second embodiment, a moved distance estimating circuit 18 is newly connected to the window size determining circuit 16 in the synchronizing position detecting circuit shown in FIG. 1. In FIG. 2, the same reference symbols are assigned to components that are the same as those in FIG. 1.

Inasmuch as a correlation circuit 10, a synchronizing position determining circuit 12, a synchronizing code generating circuit 14 and a window size determining circuit 16 shown in FIG. 2 are the same as those circuits assigned the same reference symbols in FIG. 1, respectively, explanation thereof is omitted. However, the window size determining circuit 16 in this embodiment is given an estimated moved distance 114 from the moved distance estimating circuit 18, and thus does not have the function of calculating the moved distance by multiplying the sleep time by the moving speed.

Into the moved distance estimating circuit 18 are inputted a sleep time 110 via a keyboard (not shown) or the like, and position information 116 representing a position of the base station and position information 118 representing a position of the mobile station via an interface (not shown) that are obtained by a position measuring apparatus (e.g. car navigation system) utilizing a GPS (Global Positioning System), or the like. It is assumed that the position of the mobile station represented by the position information 118 is updated at a speed fully faster than the period of the intermittent reception in this embodiment.

Figure 3:
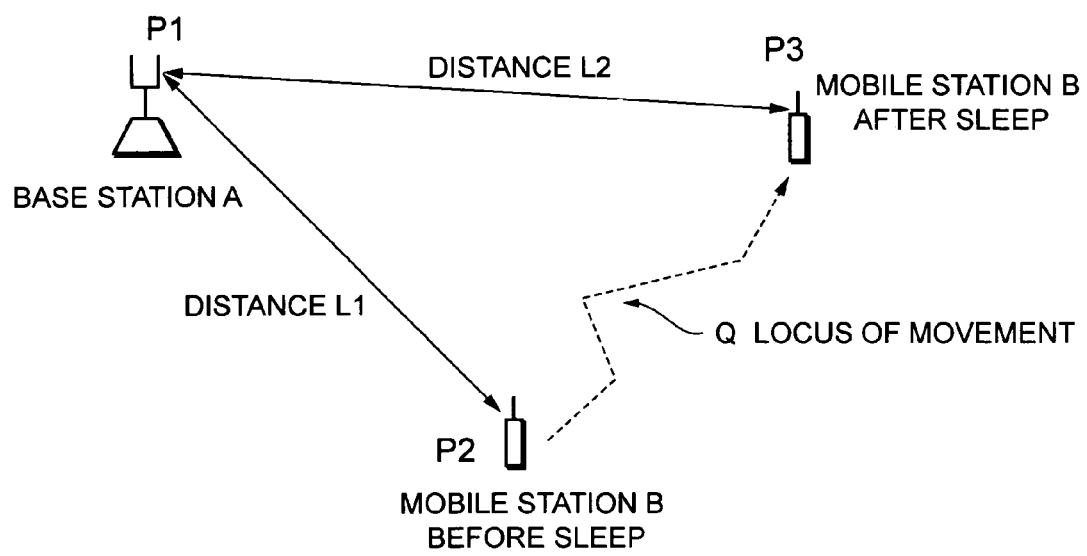
FIG. 3 is an explanatory diagram for explaining an operation of a moved distance estimating circuit in the synchronizing position detecting circuit shown in FIG. 2.

The moved distance estimating circuit 18 calculates based on the position information 116 and 118, a straight line distance between the base station and the mobile station before the start of the sleep time and a straight line distance between the base station and the mobile station after the termination of the sleep time, thereby to calculate a change in straight line distance between the base station and the mobile station during the sleep time. In this case, the moving direction of the mobile station is not concerned. For example, as shown in FIG. 3, when a mobile station B communicating with a base station A set up in a position P1 moves from a position P2 to a position P3 in a locus represented by Q during one sleep time, the moved distance estimating circuit 18 acquires the position P2 of the mobile station B upon the start of the sleep time and the position P3 of the mobile station B upon the termination of the sleep time, respectively, from the inputted position information 118. It may also be arranged that the position of the mobile station be acquired per a plurality of sleep times.

When the positions P2 and P3 of the mobile station B are acquired, the moved distance estimating circuit 18 calculates a straight line distance L1 between the position P1 of the base station A and the position P2 of the mobile station B upon the start of the sleep time, and a straight line distance L2 between the position P1 of the base station A and the position P2 of the mobile station B upon the termination of the sleep time, thereby to calculate a change x (x=L1−L2) in straight line distance between the base station A and the mobile station B that is caused by movement of the mobile station B from the position P2 to the position P3 during the sleep time. Then, the moved distance estimating circuit 18 outputs the calculated value x to the window size determining circuit 16 as the estimated moved distance 114. The estimated moved distance 114 corresponds to the moved distance in the first embodiment as the product of the sleep time 110 and the moving speed 112 shown in FIG. 1.

When the estimated moved distance 114 is fed from the moved distance estimating circuit 18, the window size determining circuit 16, like the window size determining circuit 16 in FIG. 1, determines the window size based on the estimated moved distance 114 or based on the estimated moved distance 114 and the sleep time 110. Operations of the correlation circuit 10, the synchronizing position determining circuit 12 and the synchronizing code generating circuit 14 are the same as those of the circuits assigned the same reference symbols in FIG. 1, wherein the synchronizing code 102 is outputted from the synchronizing code generating circuit 14, the correlation value 104 is outputted from the correlation circuit 10, and the synchronizing position signal 106 is outputted from the synchronizing position determining circuit 12.

As described above, according to the second embodiment, a change in straight line distance (estimated moved distance) between the base station and the mobile station caused by movement of the mobile station during the sleep time is calculated using the position information representing the moved position of the mobile station, and the size of the window for searching for the received signal 100 is determined based on the estimated moved distance. Therefore, it is possible to capture the received signal 100 securely and quickly without losing it. Further, there is also an advantage in that the window size can be determined without taking into account the moving direction and speed of the mobile station.

As described above, according to the synchronizing position detecting circuit of the present invention, when the mobile station moves on a straight line connecting the base station, the size of the window for searching for the received signal is determined taking into account the moved distance of the motile station during the sleep time. Therefore, even if the mobile station moves while it is in communication, the received signal can be captured securely and quickly.

Further, by calculating a change in straight line distance (estimated moved distance) between the base station and the mobile station caused by movement of the mobile station during the sleep time based on the position information representing the positions of the base station and the mobile station and by determining the size of the window for searching for the received signal based on the estimated moved distance, the size of the window for searching for the received signal can be determined irrespective of the moving locus of the mobile station.

What is claimed is:

1. A synchronizing position detecting circuit for use in a receiver at a mobile station in a mobile communication system, comprising:
 a window size determining circuit which calculates a moved distance in which the mobile station has moved from a first location to a second location during a sleep time based on a moving speed of the mobile station and a duration of the sleep time, the window size determining circuit selecting a window size corresponding to the moved distance for ascertaining a phase change of a received signal that includes a code;
 a synchronizing code generating circuit which repeatedly generates a synchronizing code with at least part of the code of the received signal, the synchronizing code generating circuit successively shifting a phase of the synchronizing code by a predetermined phase width so as to provide a plurality of candidate signals with phases lying within the window;
 a correlation circuit for calculating a correlation function between the candidate signals and the received signal; and
 a synchronizing position determining circuit that determines which candidate signal has a maximum correlation value with the received signal.

2. A synchronizing position detecting circuit according to claim 1, wherein when the synchronizing position determining circuit has determined which candidate signal has a maximum correlation value with the received signal, the synchronizing code generating circuit synchronizes a phase of the synchronizing code with a phase of the received signal based on the candidate signal having a maximum correlation value.

3. A synchronizing position detecting circuit according to claim 1, wherein the window size determining circuit selects a window size from a plurality of predetermined window sizes.

4. A synchronizing position detecting circuit according to claim 1, wherein the window size determining circuit selects a window size based on a phase change of the received signal corresponding to the moved distance and a phase change of the synchronizing code.

5. A synchronizing position detecting circuit according to claim 4, wherein the phase change of the synchronizing code is caused during one sleep time due to an error of the synchronizing code generating circuit.

6. A synchronizing position detecting circuit according to claim 1, wherein the synchronizing position determining circuit judges that the received signal is detected when the correlation function calculated by the correlation circuit exceeds a threshold value.

7. A synchronizing position detecting circuit for use at a receiver in a mobile station in a mobile communication system, comprising:
 a distance estimating circuit which calculates a distance between a first distance and a second distance as an estimated distance, the first distance being defined by a distance between a location where a base station is located and a location where the mobile station is located before a sleep time of the mobile station and the second distance being defined by a distance between the location where the base station is located and a location where the mobile station is located after the sleep time;
 a window size determining circuit which selects a window size, the window size being selected to accommodate a phase change of a received signal from the base station corresponding to the estimated moved distance, the received signal including a code;
 a synchronizing code generating circuit which repeatedly generates a synchronizing code that coincides with at least part of the code of the received signal, the synchronizing code generating circuit successively shifting a phase of the synchronizing code by a predetermined phase width so as to produce a plurality of a candidate signals with phases laying within the window;
 a correlation circuit which calculates a correlation function between the code candidate signals and the received signal; and
 a synchronizing position determining circuit that determines which candidate signal has a maximum correlation value with the received signal.

8. A synchronizing position detecting circuit according to claim 7, wherein when the synchronizing position determining circuit has determined which candidate signal has a maximum correlation value with the received signal, the synchronizing code generating circuit synchronizes a phase of the synchronizing code with a phase of the received signal based on the candidate signal having a maximum correlation value.

9. A synchronizing position detecting circuit according to claim 7, wherein the window size determining circuit selects a window size from a plurality of predetermined window sizes.

10. A synchronizing position detecting circuit according to claim 7, wherein the window size determining circuit selects a window size based on a phase change of the received signal corresponding to the estimated distance and a phase change of the synchronizing code.

11. A synchronizing position detecting circuit according to claim 10, wherein the phase change of the synchronizing code is caused during one sleep time due to an error of the synchronizing code generating circuit.

12. A synchronizing position detecting circuit according to claim 7, wherein the synchronizing position determining circuit judges that the received signal is detected when the correlation function calculated by the correlation circuit exceeds a threshold value.

* * * * *